(12) United States Patent
Damnjanovic et al.

(10) Patent No.: US 11,832,198 B2
(45) Date of Patent: Nov. 28, 2023

(54) CELL SYNCHRONIZATION IN PHYSICAL (PHY) LAYER AND MEDIUM ACCESS CONTROL (MAC) LAYER MOBILITY

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/365,355

(22) Filed: Jul. 1, 2021

(65) Prior Publication Data

US 2022/0007314 A1 Jan. 6, 2022

Related U.S. Application Data

(60) Provisional application No. 63/047,614, filed on Jul. 2, 2020.

(51) Int. Cl.
*H04W 56/00* (2009.01)
*H04W 36/08* (2009.01)
(Continued)

(52) U.S. Cl.
CPC ..... *H04W 56/001* (2013.01); *H04W 36/0055* (2013.01); *H04W 36/08* (2013.01); *H04W 56/0045* (2013.01); *H04W 72/23* (2023.01)

(58) Field of Classification Search
CPC . H04W 56/00; H04W 56/001; H04W 56/002; H04W 36/00; H04W 36/08;
(Continued)

(56) References Cited

U.S. PATENT DOCUMENTS

| 6,760,596 B1 * | 7/2004 | Fiorini | H04W 52/267 |
| | | | 455/67.11 |
| 2006/0146858 A1 * | 7/2006 | Kim | H04W 72/30 |
| | | | 370/465 |

(Continued)

FOREIGN PATENT DOCUMENTS

| EP | 2640138 A1 * | 9/2013 | ........ H04W 56/0045 |
| WO | 201141753 A1 | 7/2021 | |
| WO | 2021133879 A1 | 7/2021 | |

OTHER PUBLICATIONS

International Search Report and Written Opinion—PCT/US2021/040261—ISA/EPO—dated Oct. 28, 2021.

*Primary Examiner* — Warner Wong
(74) *Attorney, Agent, or Firm* — QUALCOMM Incorporated

(57) ABSTRACT

Aspects of the present disclosure relate to wireless communications, and more particularly, to mobility techniques that allow for dynamically updating a set of cells activated to serve a user equipment (UE) and synchronizing with the cells activated to serve the UE. An example method generally includes receiving, from a network entity, signaling indicating a set of cells supported by one or more distributed units (DUs) under a common central unit (CU) and one or more timing advance groups (TAGs) for the set of cells; identifying a subset of the set of cells activated to serve the UE; receiving physical (PHY) layer or medium access control (MAC) layer mobility signaling; updating the subset of activated cells based on the mobility signaling; and communicating with the subset of activated cells based on a timing advance associated with the one or more TAGs in which the updated subset of activated cells belong.

28 Claims, 15 Drawing Sheets

(51) Int. Cl.
*H04W 36/00* (2009.01)
*H04W 72/23* (2023.01)

(58) Field of Classification Search
CPC ......... H04W 36/0005; H04W 36/0055; H04W 56/004; H04W 56/0045; H04W 72/04; H04W 72/0406; H04W 72/042; H04W 74/0891; H04L 27/26035; H04L 27/2655; H04L 2027/0083; H04L 2027/0097
See application file for complete search history.

(56) References Cited

U.S. PATENT DOCUMENTS

| | | | |
|---|---|---|---|
| 2013/0034085 A1* | 2/2013 | Bostrom | H04W 56/0045 370/336 |
| 2013/0201973 A1* | 8/2013 | Ye | H04W 56/0045 370/336 |
| 2013/0235858 A1* | 9/2013 | Zhao | H04W 56/0045 370/336 |
| 2014/0192798 A1* | 7/2014 | Yang | H04W 56/0055 370/350 |
| 2014/0308956 A1* | 10/2014 | Zhang | H04W 56/0055 455/436 |
| 2015/0036666 A1* | 2/2015 | Blankenship | H04W 56/0005 370/336 |
| 2015/0049753 A1* | 2/2015 | Park | H04J 11/005 370/350 |
| 2015/0117504 A1* | 4/2015 | Harriman | H04L 43/0858 375/224 |
| 2015/0327198 A1* | 11/2015 | Axmon | H04W 56/0045 370/336 |
| 2016/0081038 A1* | 3/2016 | Dinan | H04W 36/0072 455/522 |
| 2016/0270071 A1* | 9/2016 | Dinan | H04L 1/1854 |
| 2018/0035465 A1* | 2/2018 | Ahn | H04W 72/20 |
| 2018/0332516 A1 | 11/2018 | Oak et al. | |
| 2019/0053288 A1 | 2/2019 | Zhou et al. | |
| 2019/0297549 A1* | 9/2019 | Suzuki | H04W 56/00 |
| 2020/0351730 A1* | 11/2020 | Park | H04W 36/0072 |
| 2020/0413305 A1* | 12/2020 | Rahman | H04W 56/0045 |
| 2021/0022180 A1* | 1/2021 | Lei | H04W 72/0446 |
| 2021/0227533 A1* | 7/2021 | Zhang | H04W 24/10 |
| 2021/0345271 A1* | 11/2021 | Takada | H04L 5/0035 |
| 2022/0279453 A1* | 9/2022 | Dinan | H04W 52/18 |
| 2022/0418002 A1* | 12/2022 | Dinan | H04W 52/22 |

* cited by examiner

CELL SYNCHRONIZATION IN PHYSICAL (PHY) LAYER AND MEDIUM ACCESS CONTROL (MAC) LAYER MOBILITY

CROSS-REFERENCE TO RELATED APPLICATIONS

This application claims benefit to U.S. Provisional Patent Application Ser. No. 63/047,614, entitled "Cell Synchronization in Physical (PHY) Layer and Medium Access Control (MAC) Layer Mobility," filed Jul. 2, 2020 and assigned to the assignee hereof, the contents of which are hereby incorporated by reference in its entirety.

TECHNICAL FIELD

Aspects of the present disclosure relate to wireless communications, and more particularly, to mobility techniques that allow for dynamically updating a set of cells activated to serve a user equipment (UE) and synchronizing with the set of cells activated to serve the UE.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes receiving, from a network entity, signaling indicating a set of cells supported by one or more distributed units (DUs) under a common central unit (CU) and one or more timing advance groups (TAGs) for the set of cells, identifying a subset of the set of cells activated to serve the UE, receiving physical (PHY) layer or medium access control (MAC) layer mobility signaling, updating the subset of activated cells based on the mobility signaling, and communicating with the subset of activated cells based on a timing advance associated with the one or more TAGs in which the updated subset of activated cells belong.

One innovative aspect of the subject matter described in this disclosure can be implemented in a method for wireless communication by a network entity. The method generally includes transmitting, to a user equipment (UE), an indication of a set of cells supported by one or more distributed units (DUs) under a common central unit (CU) and one or more timing advance groups (TAGs) for the set of cells, communicating with the UE via a subset of the set of cells that are activated for serving the UE based on timing advance values associated with the one or more TAGs for the set of cells, and transmitting, to the UE, physical (PHY) layer or medium access control (MAC) layer mobility signaling to update the subset of the set of cells that are activated for serving the UE.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for dynamically updating a set of cells activated to serve a user equipment (UE) and synchronizing the cells activated to serve the UE. As will be described in greater detail below, the set of activated cells may be updated based on physical (PHY) layer (Layer1 or L1) or medium access control (MAC) layer (Layer2 or L2) signaling that indicates one or more cells to activate and/or deactivate.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
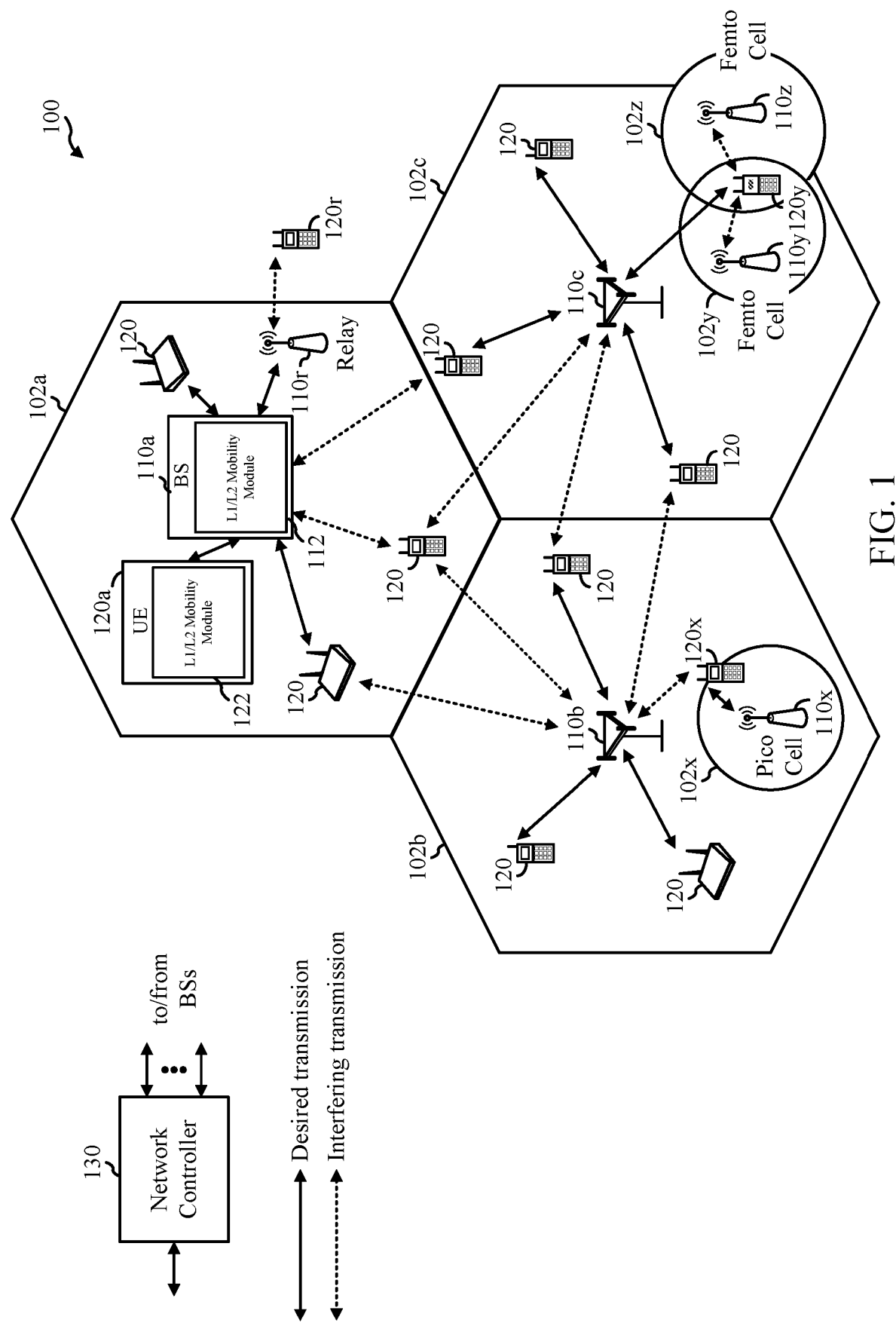
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an L1/L2 mobility module 122 that may be configured to perform (or cause UE 120a to perform) operations 900 of FIG. 9. Similarly, a BS 120a may include an L1/L2 mobility module 112 that may be configured to perform (or cause BS 110a to perform) operations 1000 of FIG. 10.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

The term "cell" may refer to a logical communication entity used for communication with a base station 110 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area or a portion of a geographic coverage area (e.g., a sector) over which the logical communication entity operates. Such cells may range from smaller areas (e.g., a structure, a subset of structure) to larger areas depending on various factors such as the capabilities of the base station 110. For example, a cell may be or include a building, a subset of a building, or exterior spaces between or overlapping with geographic coverage areas, among other examples.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
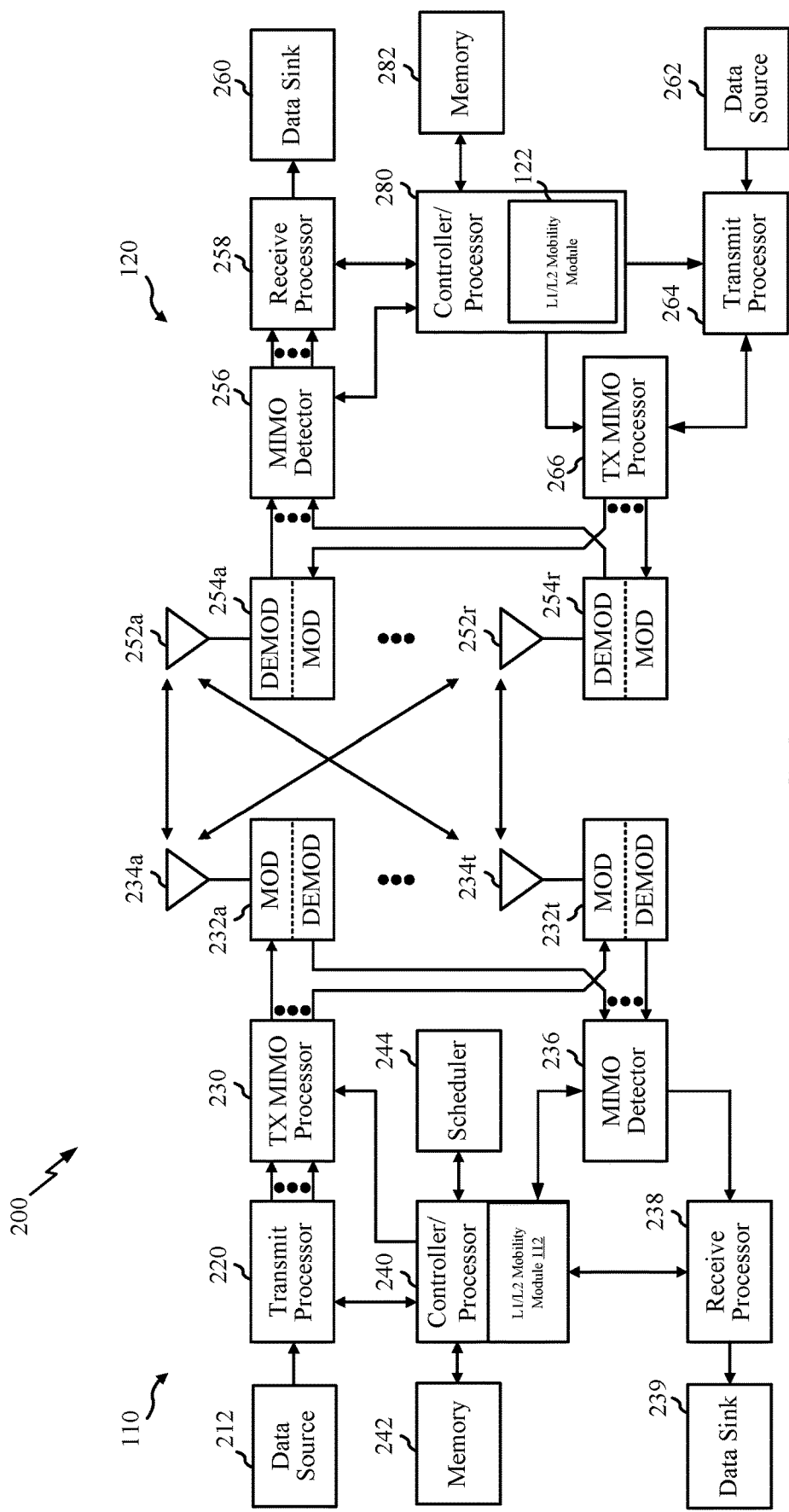
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has an L1/L2 mobility module 122 that may be configured to perform (or cause UE 120 to perform) operations 900 of FIG. 9. Similarly, the BS 120a may include an L1/L2 mobility module 112 that may be configured to perform (or cause BS 110a to perform) operations 1000 of FIG. 10.

Figure 3A:
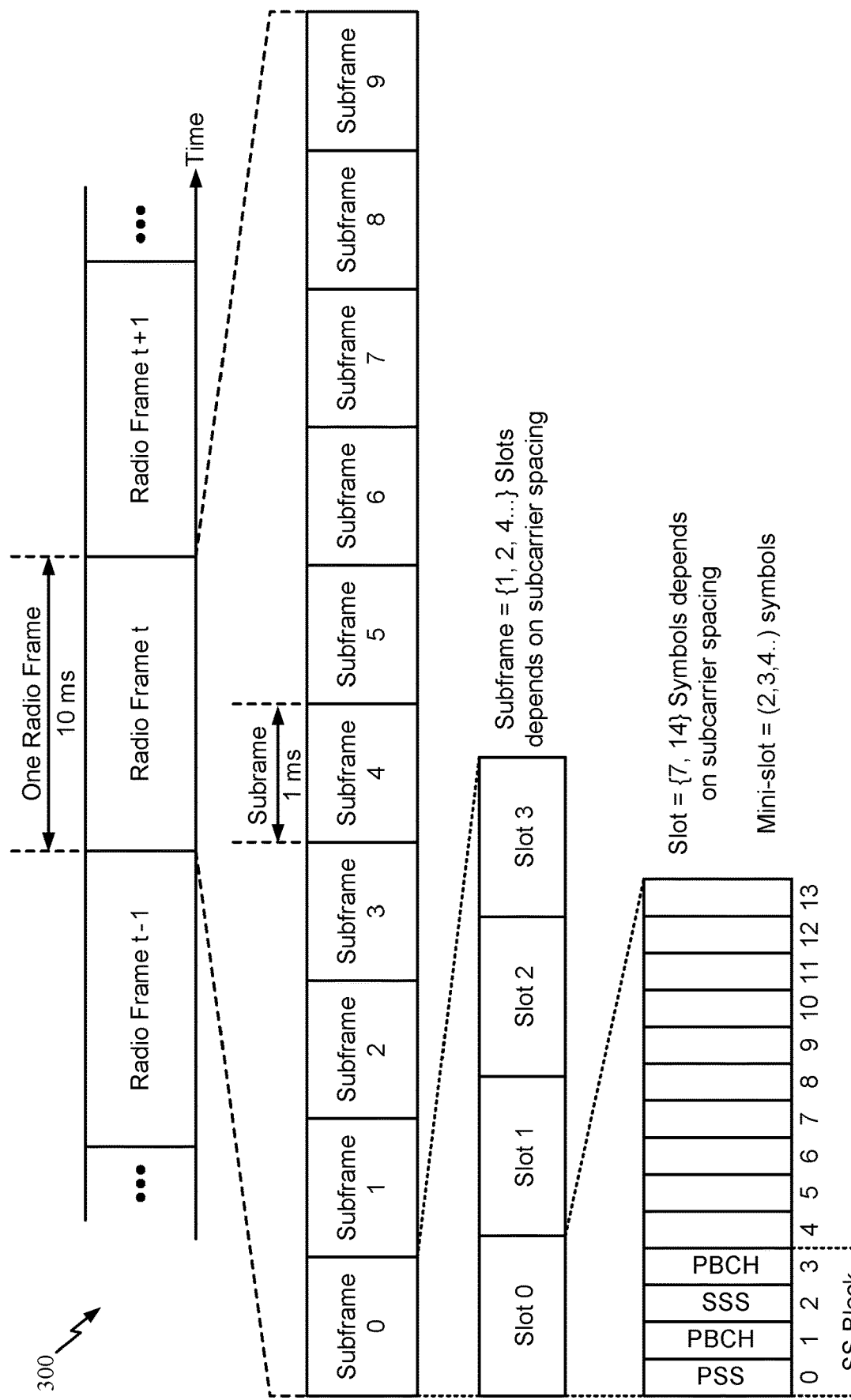
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
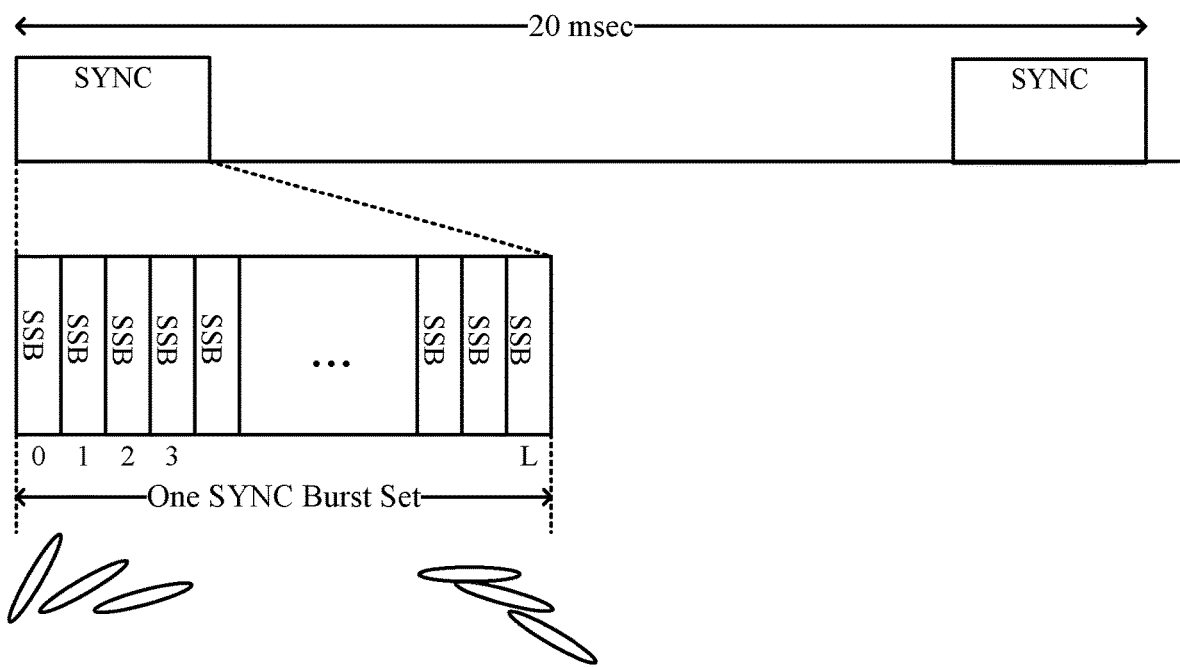
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for L1/L2 Mobility Active Set Management and Cell Synchronization Aspects of the present disclosure relate to wireless communications, and more particularly, to mobility techniques that allow for dynamically updating a set of cells activated to serve a user equipment (UE) and synchronizing with the set of cells activated to serve the UE. As will be described in greater detail below, the set of activated cells may be updated based on physical (PHY) layer (Layer1 or L1) or medium access control (MAC) layer (Layer2 or L2) signaling that indicates one or more cells to activate and/or de-activate.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

In multi-beam operation (e.g., involving FR1 and FR2 bands), more efficient uplink/downlink beam management may allow for increased intra-cell and inter-cell mobility (e.g., L1 and/or L2-centric mobility) and/or a larger number of transmission configuration indicator (TCI) states. For example, the states may include the use of a common beam for data and control transmission and reception for UL and DL operations, a unified TCI framework for UL and DL beam indication, and enhanced signaling mechanisms to improve latency and efficiency (e.g., dynamic usage of control signaling).

The techniques presented herein provide signaling mechanisms that may help support such enhanced features, improve latency, and improve efficiency with more usage of dynamic control signaling. For example, the techniques described herein make use of physical layer (PHY, Layer1, or L1) or medium access control (MAC, Layer2 or L2) signaling, as opposed to higher layer (e.g., RRC) signaling.

Figure 4:
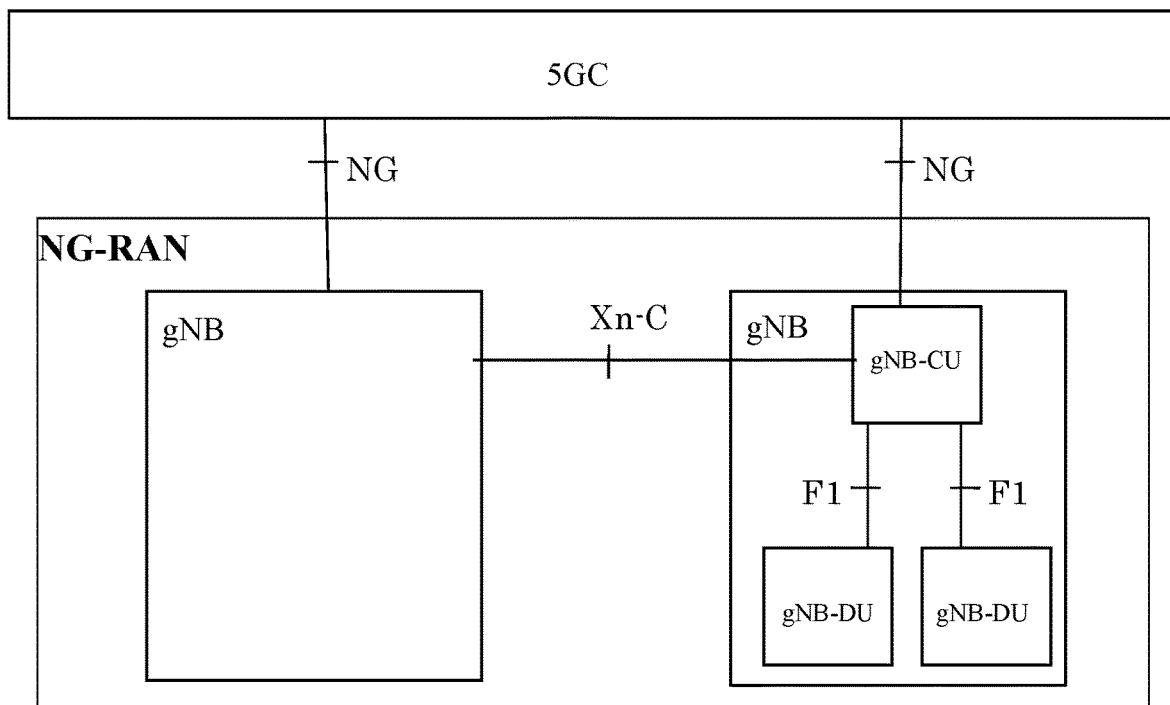
FIG. 4 illustrates an example architecture in which aspects of the present disclosure may be practiced.

FIG. 4 illustrates an example architecture in which aspects of the present disclosure may be practiced. As illustrated, the architecture includes a gNB Central Unit (gNB-CU). The gNB-CU generally serves as a logical node hosting RRC, Service Data Adaptation Protocol (SDAP) and PDCP protocols of the gNB that controls the operation of one or more gNB distributed units (gNB-DUs). As illustrated, the gNB-CU terminates an F1 interface connected with the gNB-DU.

Figure 5:
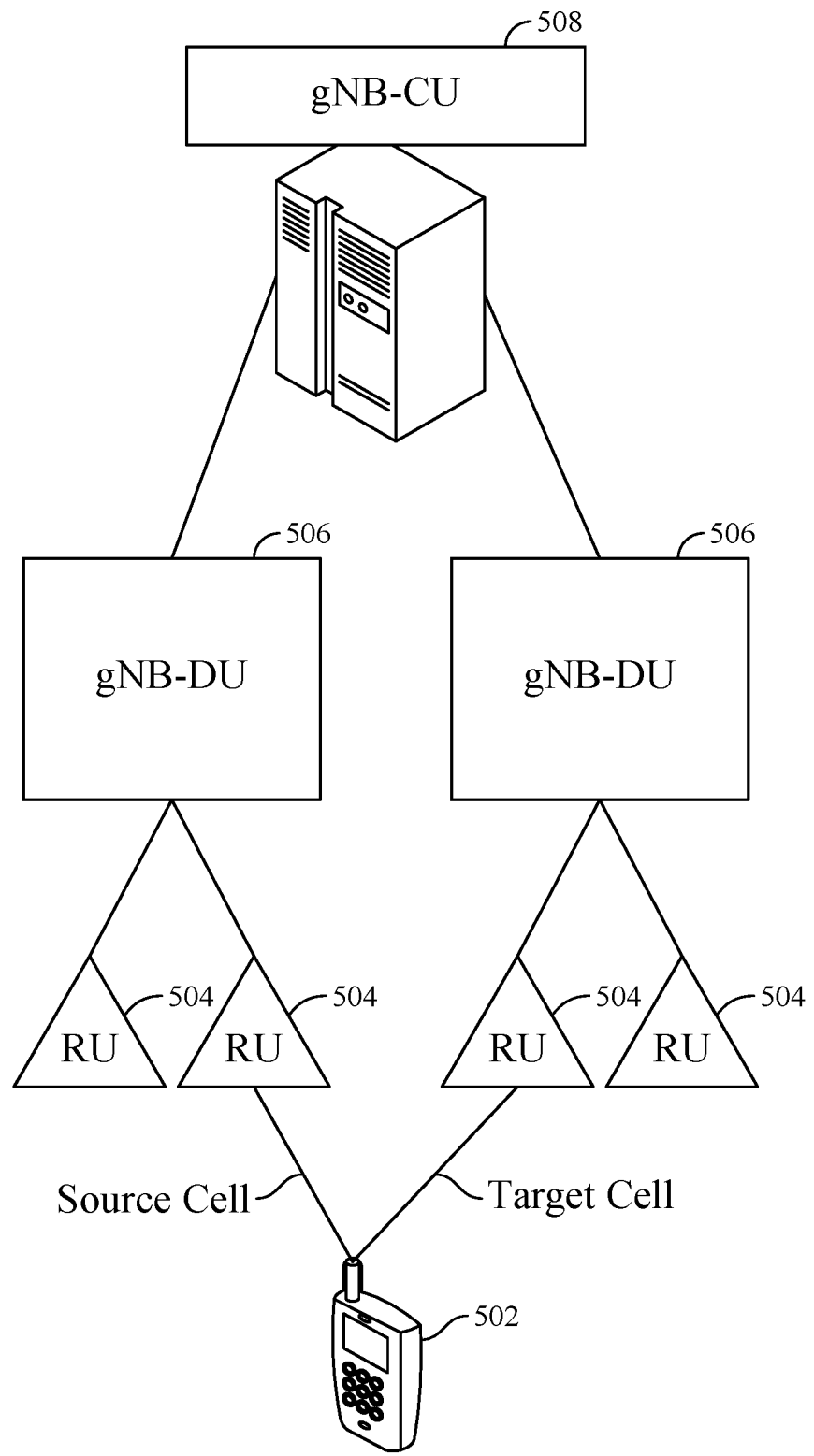
FIGS. 5 and 6 illustrate example scenarios in which aspects of the present disclosure may be practiced.
Figure 6:
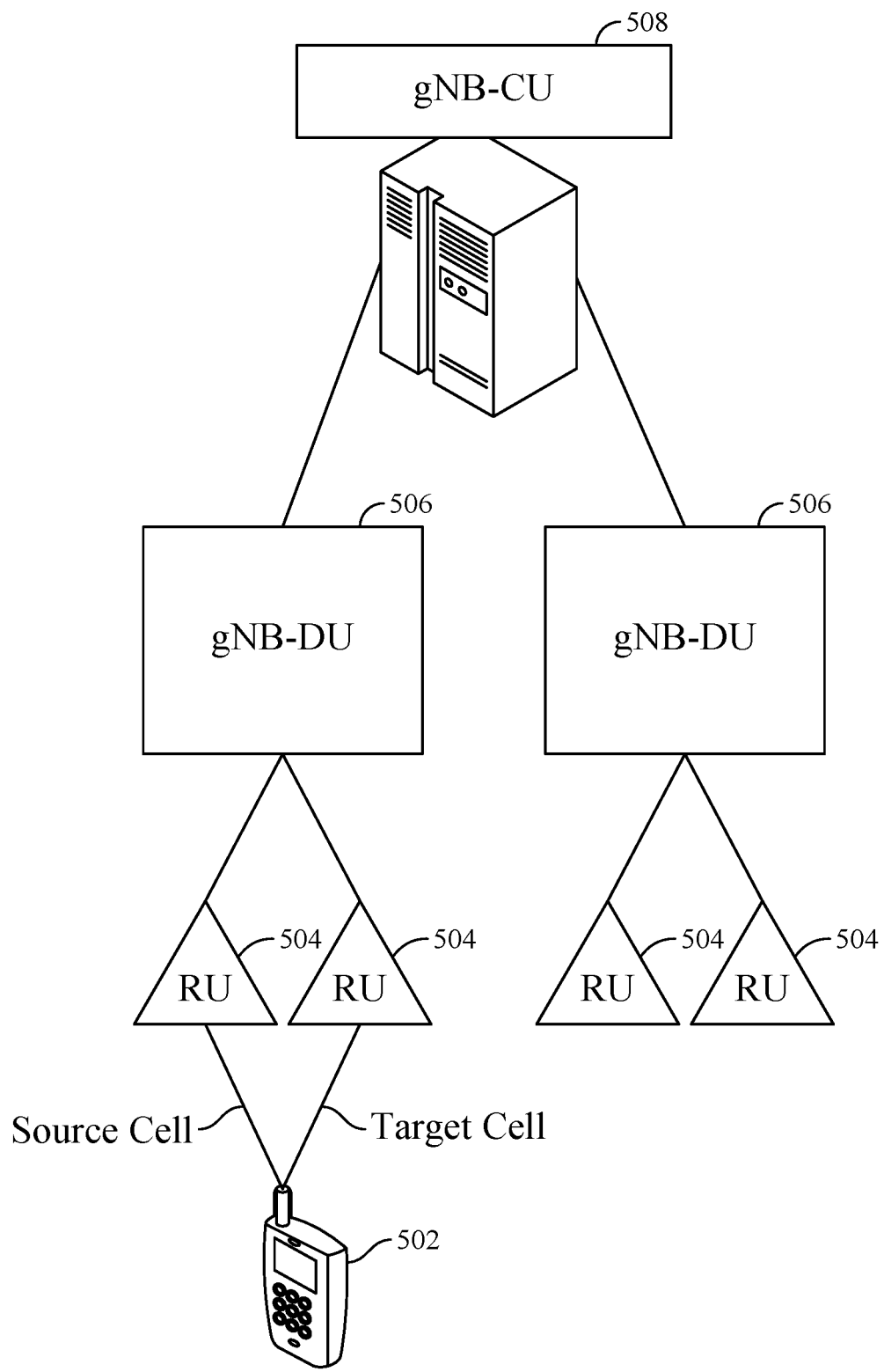

A gNB-DU generally serves as a logical node hosting RLC, MAC and PHY layers of the gNB, and its operation is controlled by gNB-CU. As illustrated in FIGS. 5 and 6, one gNB-DU supports one or multiple cells; however, each cell is supported by only one gNB-DU. The gNB-DU terminates the F1 interface connected with the gNB-CU.

FIGS. 5 and 6 illustrate example scenarios in which aspects of the present disclosure may be practiced.

As illustrated in FIG. 5, in some cases, a UE 502 may be handed over between (source and target) cells supported by radio units, or RUs, 504 of different DUs 506 under the same CU 508. The RUs 504 generally contain only PHY layer logic. In the scenario illustrated in FIG. 5, the cells could have non-collocated (in different DUs) PHY, MAC, and RLC logic, but common PDCP and RRC logic (the same CU). While L1/L2 signaling techniques described herein may be used for mobility, the data path from PDCP to different RLCs present some control aspects that may be addressed by coordination between DUs.

In the scenario illustrated in FIG. 6, on the other hand, source and target cells are supported by (belong to) the same DU. Thus, L1/L2 mobility may be particularly attractive in this scenario, as the cells can share MAC and upper layers (same DU). In this scenario, when performing a handover via L1/L2 signaling, the data path at MAC and above stays the same.

As noted above, the distributed RUs contain only PHY layer and may be used (activated/de-activated) in a similar manner to carrier aggregation (CA), but cells may be on the same carrier frequencies. As such, aspects of the present disclosure, however, may utilize mechanisms similar to those used in CA to enable L1/L1 mobility (e.g., activating/de-activating cells).

FIG. 7 illustrates an example of UE mobility, in accordance with certain aspects of the present disclosure.

As noted above, as an initial step, RRC signaling may be used to configure a set of cells 702 for L1/L2 mobility. The example of FIG. 7A assumes a configured set of 8 cells (Cells1-8). In general, the cell set may be designed to be large enough to cover meaningful mobility (e.g., anticipated mobility of a UE within a given area and given time). As will be described below, mobility management may be performed by activating/de-activating cells in the set.

Figure 7A:
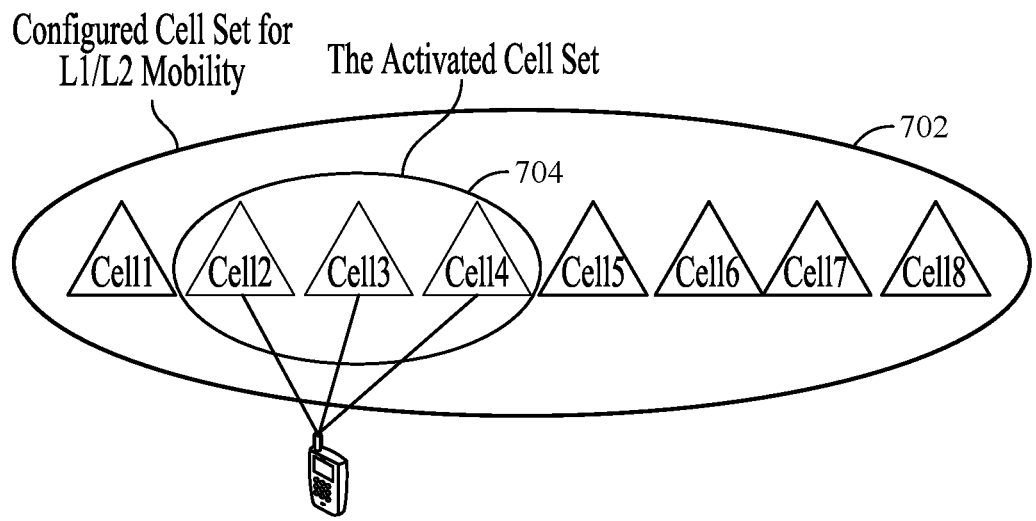
FIGS. 7A and 7B illustrate an example of UE mobility, in accordance with some aspects of the present disclosure.

From the configured set of cells 702, at any given time, a certain set of cells 704 may be activated. This activated cell set 704 generally refers to a group of cells in the configured set that are activated. Referring again to FIG. 7A, the activated cell set 704 includes Cells 2-4. Which cells are activated for any given UE may depend on UE reported measurements. Configured cells that are not activated (a deactivated cell set) may include the (remaining) group of cells in in the configured set 702 that are deactivated (not activated). In FIG. 7A, the deactivated cell set includes Cell 1 and Cells5-8.

Aspects of the present disclosure may provide for seamless mobility within the activated cells in the activated cell set. In some cases, the signaling mechanism may be relatively similar to beam management. For example, mobility management within the activated set may be performed through L1/L2 signaling used to activate/deactivate cells in the activated and deactivated cell sets to select beams within the activated cells.

Figure 7B:
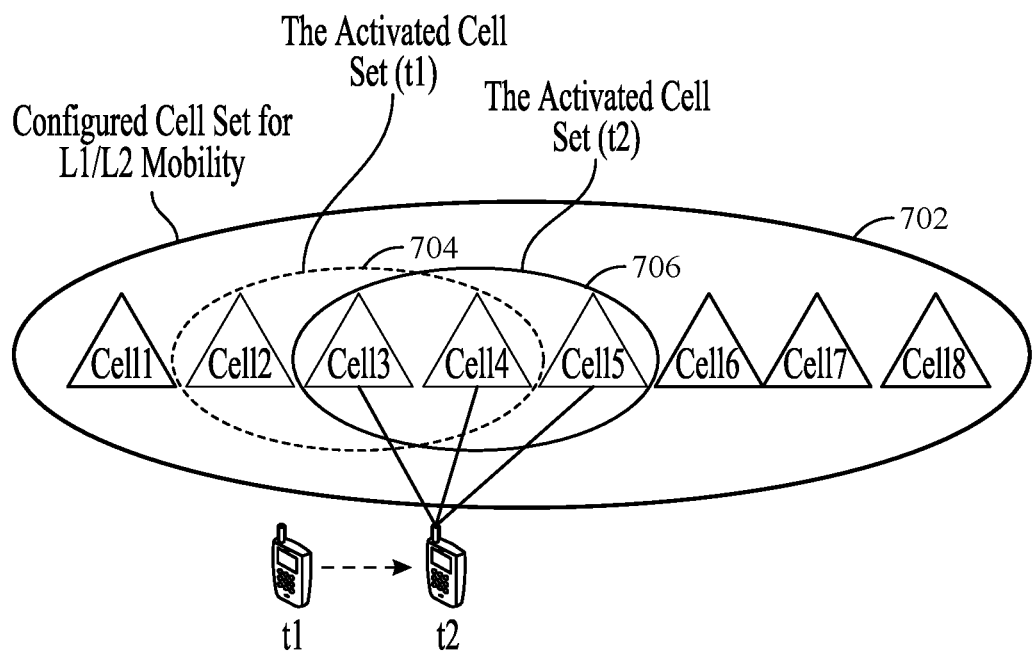

As illustrated in FIG. 7B, as the UE moves, cells from the configured set of cells 702 are deactivated and activated, for example, based on signal quality (measurements reported by the UE) and other considerations (e.g., loading of the cells). In the example shown in FIG. 7B, as the UE moves from left (at time t1) to right (at time t2), cell 5 (which is now closer) is activated and cell 2 (which is now farther) is deactivated. Thus, after the move, the new activated cell set 706 includes Cell3, Cell4, and Cell5, in contrast to the previous activated cell set 704 which includes Cell2, Cell3, and Cell4.

The cells that are activated/deactivated by L1/L2 signaling may be based on network control, UE recommendation, or UE decision. In general, the L1/L2 signaling (e.g., DCI and/or MAC-CEs) could carry activation and/or deactivation commands (e.g., that indicate cells to be activated and cells to be deactivated).

If a UE is capable of supporting only one activated cell at a time, an activation command indicating a new cell could implicitly deactivate a currently active cell (e.g. upon UE acknowledging the command).

Figure 8:
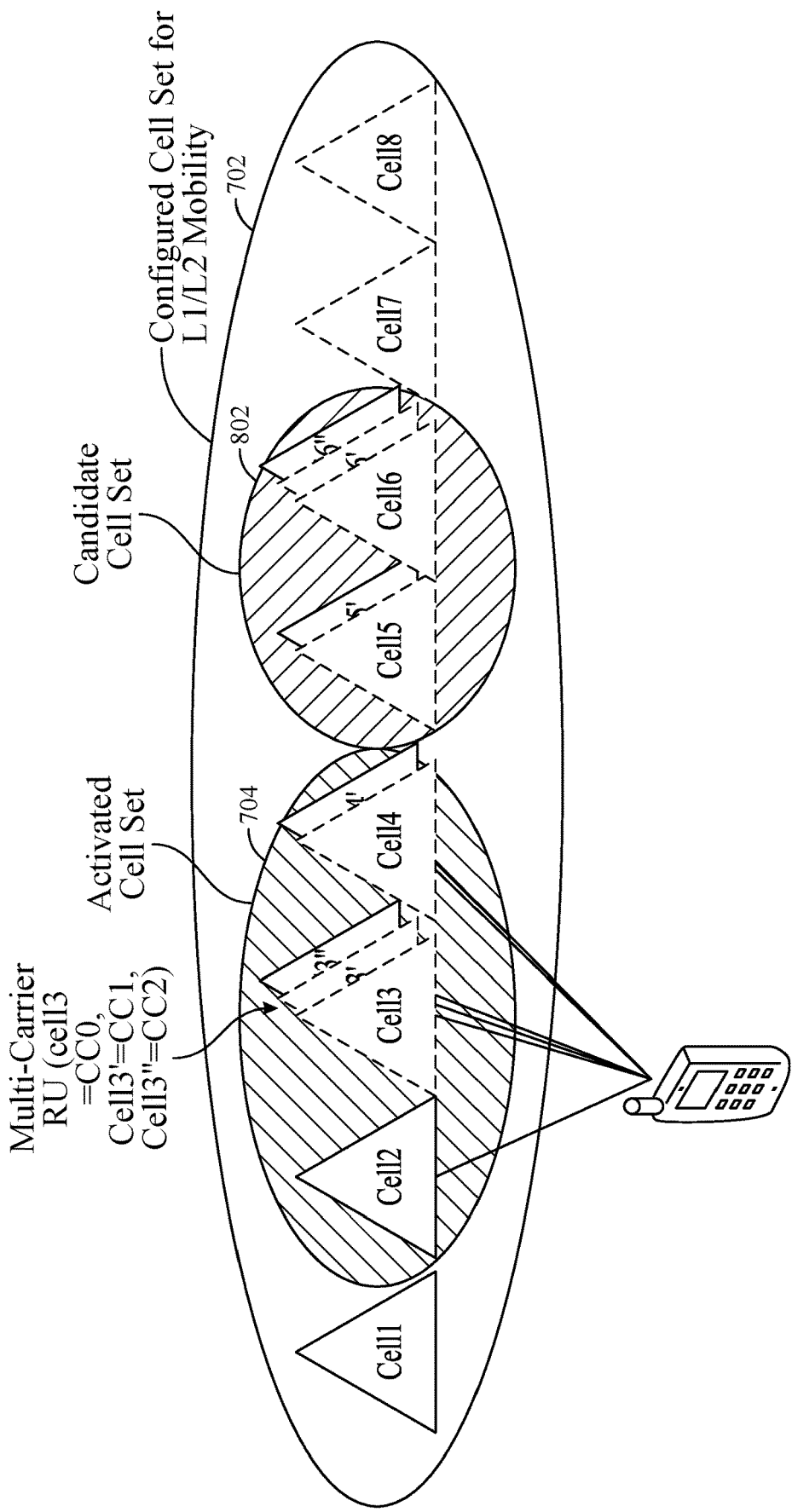
FIG. 8 illustrates an example of radio units that support multiple carriers, in accordance with some aspects of the present disclosure.

In some cases, one or more of the RUs may have multiple carrier support (with each carrier being a cell). In such cases, activation/deactivation of cells can be done in groups of carriers (cells). For example, referring to FIG. 8, RUs for Cells3-6 assume RUs that support multiple carriers. In the illustrated example, the same RU supports Cell3 (on CC0), Cell3' (on CC1) and Cell3" (on CC2). In this example, all three of the cells may be activated, de-activated at the same time. Further, within the set of cells 702, a candidate cell set 802 may be configured. The cells in the candidate cell set 802 may include cells that may be selected as a primary cell for communications with the UE, as discussed herein.

Aspects of the present disclosure may provide for cell synchronization in mobility within a set of cells using physical (PHY) layer or medium access control (MAC) layer signaling (e.g., L1 or L2 signaling).

Figure 9:
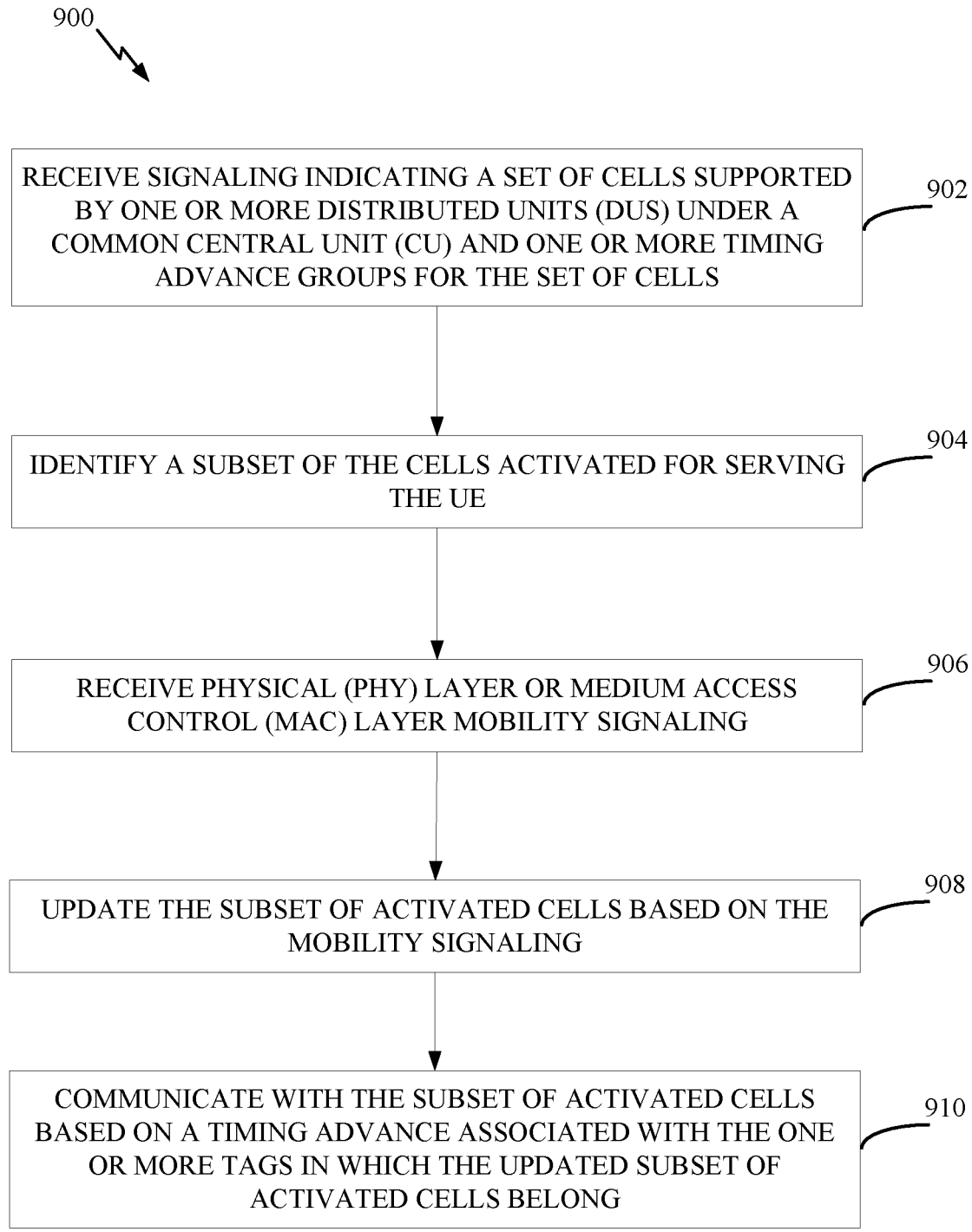
FIG. 9 illustrates example operations for wireless communication by a user equipment (UE), in accordance with some aspects of the present disclosure.

FIG. 9 illustrates example operations that may be performed by a UE to identify and synchronize with an activated set of cells in L1/L2-based mobility, in accordance with certain aspects of the present disclosure. Operations 900 may be performed, for example, by a UE 120 illustrated in FIG. 1.

Operations 900 begin, at 902, where the UE receives, from a network entity, signaling indicating a set of cells supported by one or more distributed units (DUs) under a common central unit (CU) and one or more timing advance groups (TAGs) for the set of cells. The signaling indicating the set of cells supported by one or more DUs under a common CU may be carried in radio resource control (RRC) signaling. Generally, the set of cells may be cells that support PHY layer or MAC layer mobility.

At 904, the UE identifies a subset of the set of cells activated to serve the UE. The subset of the set of cells activated to serve the UE may include one or more cells. Generally, in identifying the subset of the set of cells activated to serve the UE, the UE can measure one or more cells in the set of cells activated. These measurements may be based, for example, on reference signals transmitted by the cells in the set of cells, signals in synchronization signal blocks (SSBs) transmitted by the cells in the set of cells, or other signaling which a UE can detect (e.g., using blind detection or using configured information about cell identity and timing). Based on these measurements, the UE can select one or more cells. For example, the UE can select cells in the set of cells that have measured signal strengths that exceed a threshold value as identified subset of cells. In some examples, the UE can select up to a maximum number of cells that satisfy one or more measurement criteria as the cells in the identified subset of cells.

At 906, the UE receives physical (PHY) layer or medium access control (MAC) layer mobility signaling. Generally, the PHY layer or MAC layer mobility signaling may include information about cells that are activated to serve the UE and cells that are deactivated or otherwise are to be removed from an activated set of cells. The PHY layer or MAC layer mobility signaling may be received, for example, in response to measurement reports provided to a network entity or based on transmission of one or more reference signals to a network entity for the network entity to use in measuring a channel.

At 908, the UE updates the subset of activated cells based on the mobility signaling. Generally, in updating the subset of activated cells, the UE may add newly activated cells identified in the mobility signaling to the subset of activated cells and/or remove cells from the subset of activated cells based on an identification of one or more cells in the mobility signaling.

At 910, the UE communicates with the subset of activated cells based on a timing advance associated with the one or more TAGs in which the updated subset of activated cells belong.

Figure 10:
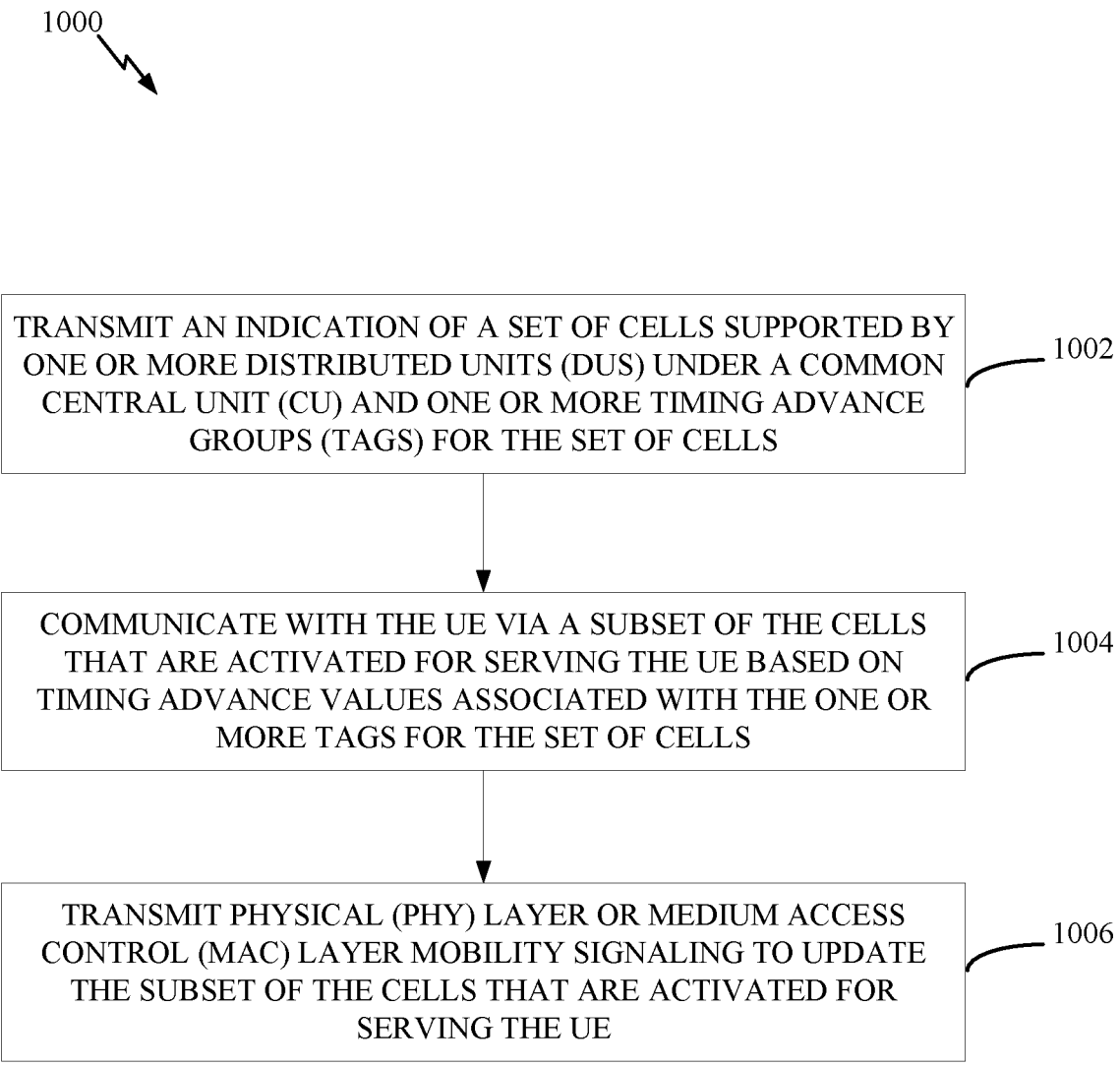
FIG. 10 illustrates example operations for wireless communication by a network entity, in accordance with some aspects of the present disclosure.

FIG. 10 illustrates example operations 1000 that may be considered complementary to operations 900 of FIG. 9. For example, operations 900 may be performed by a network entity (e.g., a gNB DU/CU) to dynamically activate cells to support mobility for a UE (e.g., a UE performing operations 900 of FIG. 9).

As illustrated, operations 1000 begin, at 1002, where the network entity transmits, to a user equipment (UE), an indication of a set of cells supported by one or more distributed units (DUs) under a common central unit (CU) and one or more timing advance groups (TAGs) for the set of cells. The set of cells generally include cells that support PHY layer or MAC layer mobility.

At 1004, the network entity communicates with the UE via a subset of the set of cells that are activated for serving the UE based on timing advance values associated with the one or more TAGs for the set of cells.

At 1006, the network entity transmits, to the UE, physical (PHY) layer or medium access control (MAC) layer mobility signaling to update the subset of the set of cells that are activated for serving the UE.

The cells in a set of cells supported by the one or more DUs under a common CU may belong to the same timing advance group (TAG) or different TAGs. Generally, a TAG includes one or more cells for which a same timing advance value is applicable. Generally, using a single TAG may simplify operations relative to supporting multiple TAGs for the cells in the set of cells supported by the one or more DUs under a common CU.

In aspects where a single TAG is supported, each cell in the set of cells may be associated with a same timing advance value. The use of a single TAG for the cells in the set of cells may reduce processing complexity for L1/L2 mobility, as a single TAG may be applied whenever cells are added to and/or removed from the subset of cells activated for serving the UE. A single TAG for the cells in the set of cells may be used in some deployments where the propagation delay difference for the cells in the set of cells is below a threshold amount. For example, a single TAG for the cells in the set of cells may be used in a scenario in which a UE is a similar distance away from the cells in the set of cells.

In some aspects, multiple TAGs may be supported. Cells in the set of cells supported by the one or more DUs under a common CU may be divided into a plurality of groups, and each group may be preconfigured with an appropriate TAG identifier. The network may preconfigure a UE with the TAG identifiers and associations between cells and TAGs by transmitting configuration information to the UE that associates each cell in the set of cells with one of the one or more TAGs. When a cell is added to the subset of cells activated for serving the UE, the UE may place the added cell in the appropriate (corresponding) TAG (as identified in the configuration information) and apply the appropriate timing advance to that cell.

In some aspects, to place the added cell in the appropriate cell, the network entity may provide timing adjustment information for the added cell to the UE. The timing adjustment may be provided to the UE, for example, in the mobility signaling that updates the subset of the set of cells that are activated for serving the UE.

Figure 11:
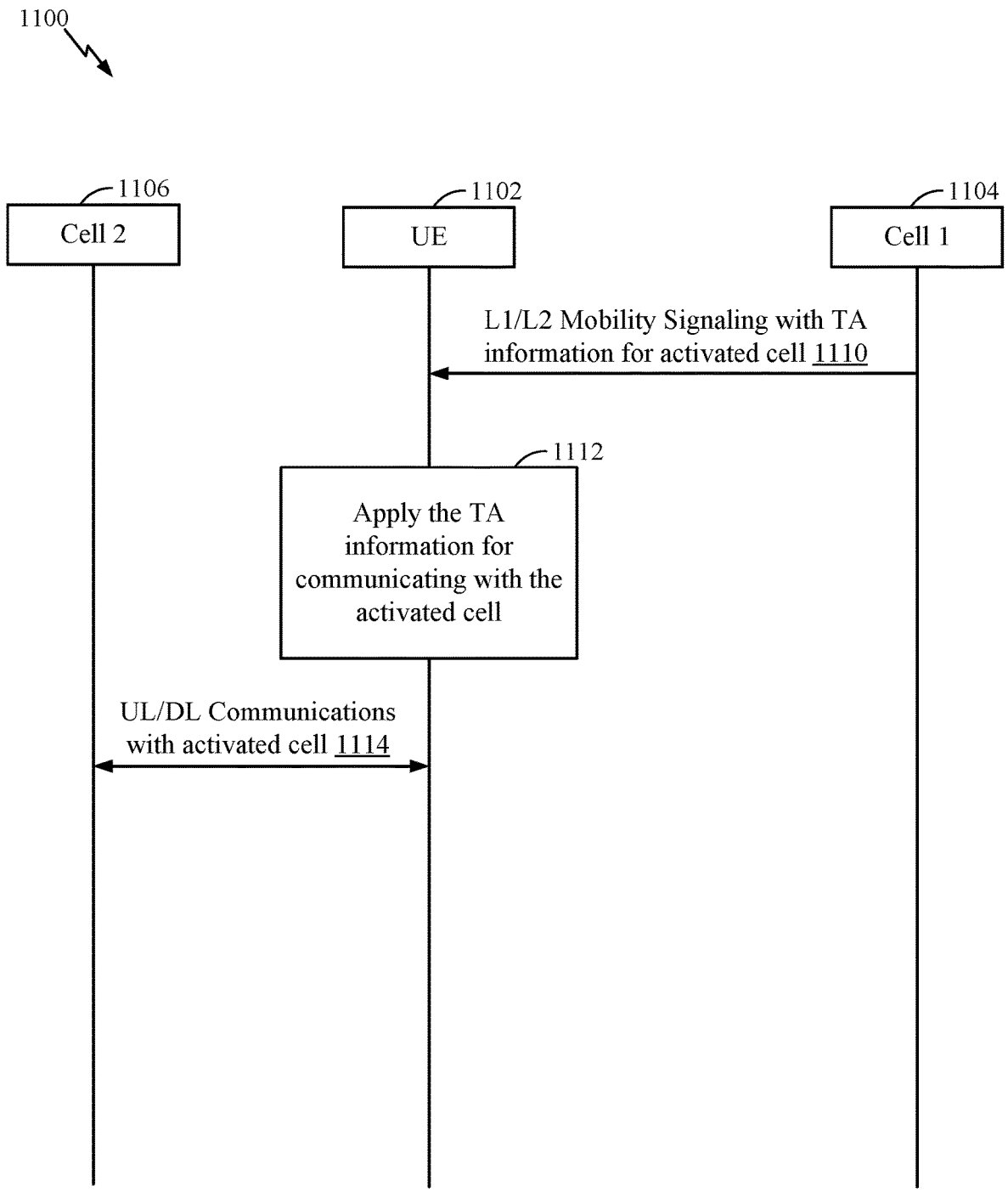
FIG. 11 is a call flow diagram illustrating messages exchanged between a user equipment (UE) and network entities for configuring timing advance for activated cells in L1/L2 mobility, in accordance with some aspects of the present disclosure.

FIG. 11 is a call flow diagram 1100 illustrating L1/L2-based mobility in which a UE 1102 receives mobility signaling with timing advance information for activated cells in the set of cells. As discussed above, the set of cells generally include cells that support PHY layer or MAC layer mobility. As illustrated, a UE 1102 receives L1/L2 mobility signaling 1110 (e.g., PHY layer or MAC layer mobility signaling) from one cell in a set of cells activated to serve the UE, such as cell 1104 illustrated in FIG. 11. The L1/L2 mobility signaling 1110 generally includes information identifying one or more cells to add to the activated cell set and timing advance information for the identified one or more cells. The L1/L2 mobility signaling 1110 may also include information identifying cells to deactivate and thus remove from the activated cell set.

At 1112, based on receiving receives the L1/L2 mobility signaling 1110, the UE can add the identified one or more cells to the activated cell set, and for each of the identified one or more cells, apply the appropriate timing advance for communications with each of the cells.

Subsequently, the UE and the identified cells can communicate 1114 with cell 1106 using the timing advance associated with the appropriate cell (e.g., cell 1106) and included in the L1/L2 mobility signaling 1110.

In some aspects, the mobility signaling may not include timing adjustment information, but may include signaling that instructs the UE to perform random access at the added cell. In such a case, the UE may perform a random access procedure with the cell(s) identified in the mobility signaling and receive, from the cell(s), timing advance information to apply to the cell(s) based on performing the random access procedure. Generally, TA commands for the subset of cells activated to serve the UE may be applied on a per-TAG basis.

Figure 12:
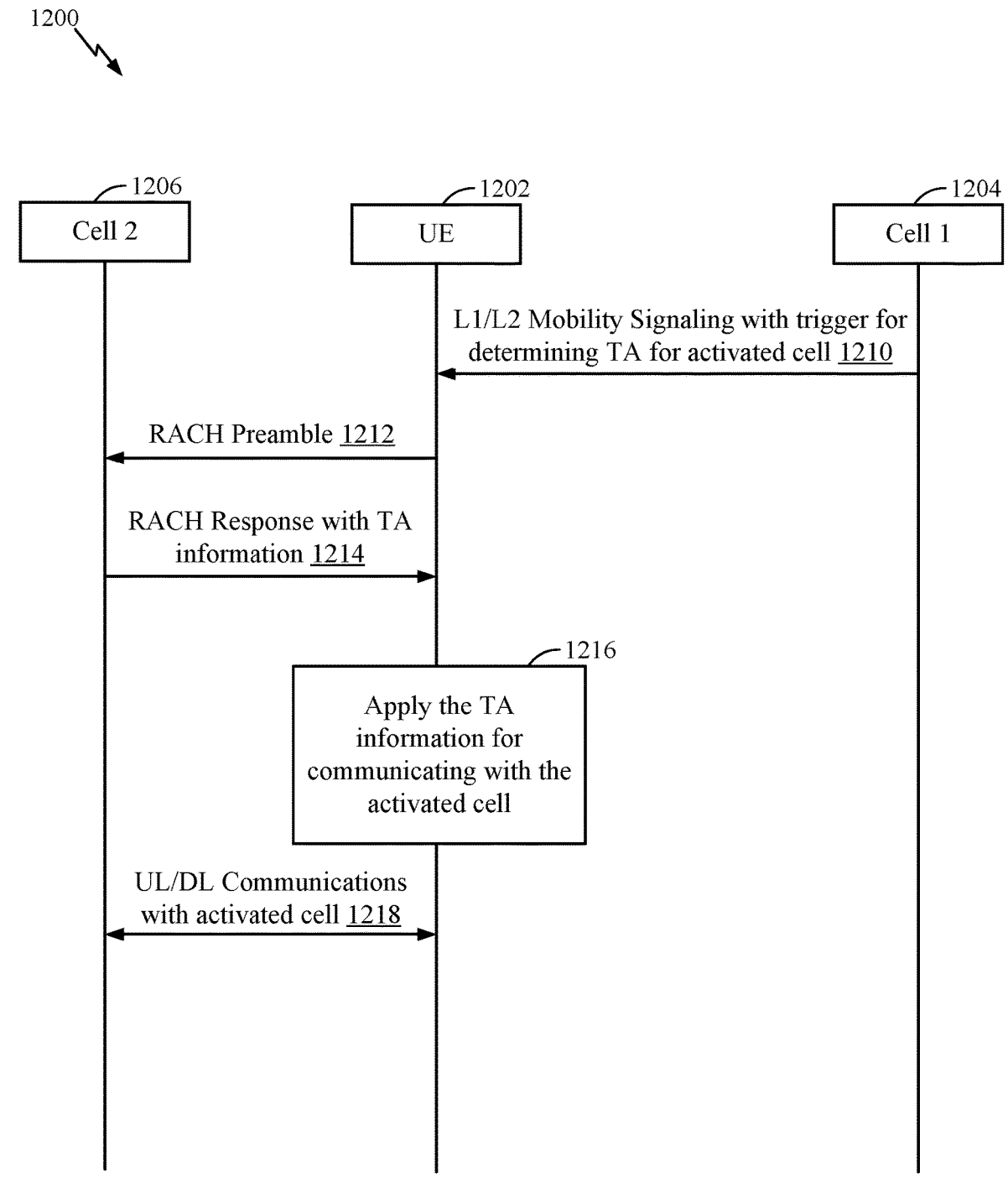
FIG. 12 is a call flow diagram illustrating messages exchanged between a user equipment (UE) and network entities for triggering a RACH procedure to determine a timing advance for activated cells in L1/L2 mobility, in accordance with some aspects of the present disclosure.

FIG. 12 is a call flow diagram 1200 illustrating L1/L2-based mobility in which a UE 1202 receives mobility signaling with a trigger to perform a RACH procedure with an identified cell. As illustrated, the UE 1202 receives L1/L2 mobility signaling 1210 (e.g., PHY layer or MAC layer mobility signaling). Generally, the L1/L2 mobility signaling includes information identifying a cell to add to the activated cell set (e.g., cell 1106 in this example) and a trigger indicating that the UE is to perform a RACH procedure with the identified cell (e.g., cell 1106).

In response to receiving the L1/L2 mobility signaling 1210, the UE transmits a RACH preamble 1212 to the identified cell 1206, and the UE 1202 receives a RACH response 1214 from the identified cell 1206 in response to transmitting the RACH preamble 1212. The RACH response 1206 may include timing advance information or otherwise include information from which a timing advance to apply to the identified cell 1206 may be derived.

At 1216, the UE 1202 can then apply the timing advance for communications with the identified cell 1206 and perform uplink and downlink communications 1218 with the identified cell.

Figure 13:
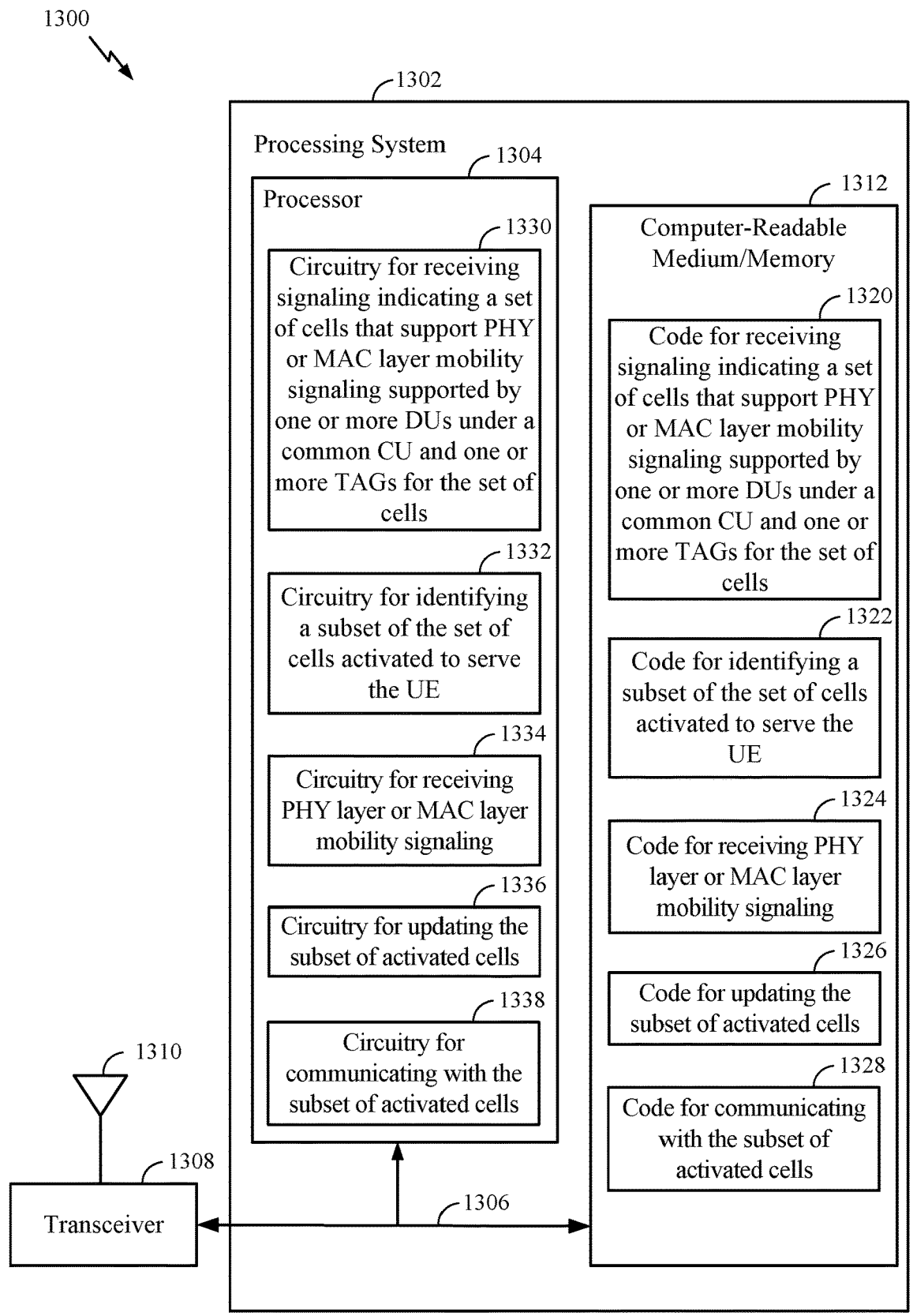
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein for mobility within a set of cells using PHY layer or MAC layer signaling based on PHY layer or MAC layer measurement procedures. In certain aspects, computer-readable medium/memory 1312 stores code 1320 for receiving signaling indicating a set of cells that support PHY or MAC layer mobility signaling supported by one or more DUs under a common CU and one or more TAGs for the set of cells; code 1322 for identifying a subset of the set of cells activated to serve the UE; code 1324 for receiving PHY layer or MAC layer mobility signaling; code 1326 for updating the subset of activated cells; and code 1328 for communicating with the subset of activated cells. In certain aspects, the processor 1304 has circuitry configured to implement the code stored in the computer-readable medium/memory 1312. The processor 1304 includes circuitry 1330 for receiving signaling indicating a set of cells that support PHY or MAC layer mobility signaling supported by one or more DUs under a common CU and one or more TAGs for the set of cells; circuitry 1332 for identifying a subset of the set of cells activated to serve the UE; circuitry 1334 for receiving PHY layer or MAC layer mobility signaling; circuitry 1336 for updating the subset of activated cells; and circuitry 1338 for communicating with the subset of activated cells.

Figure 14:
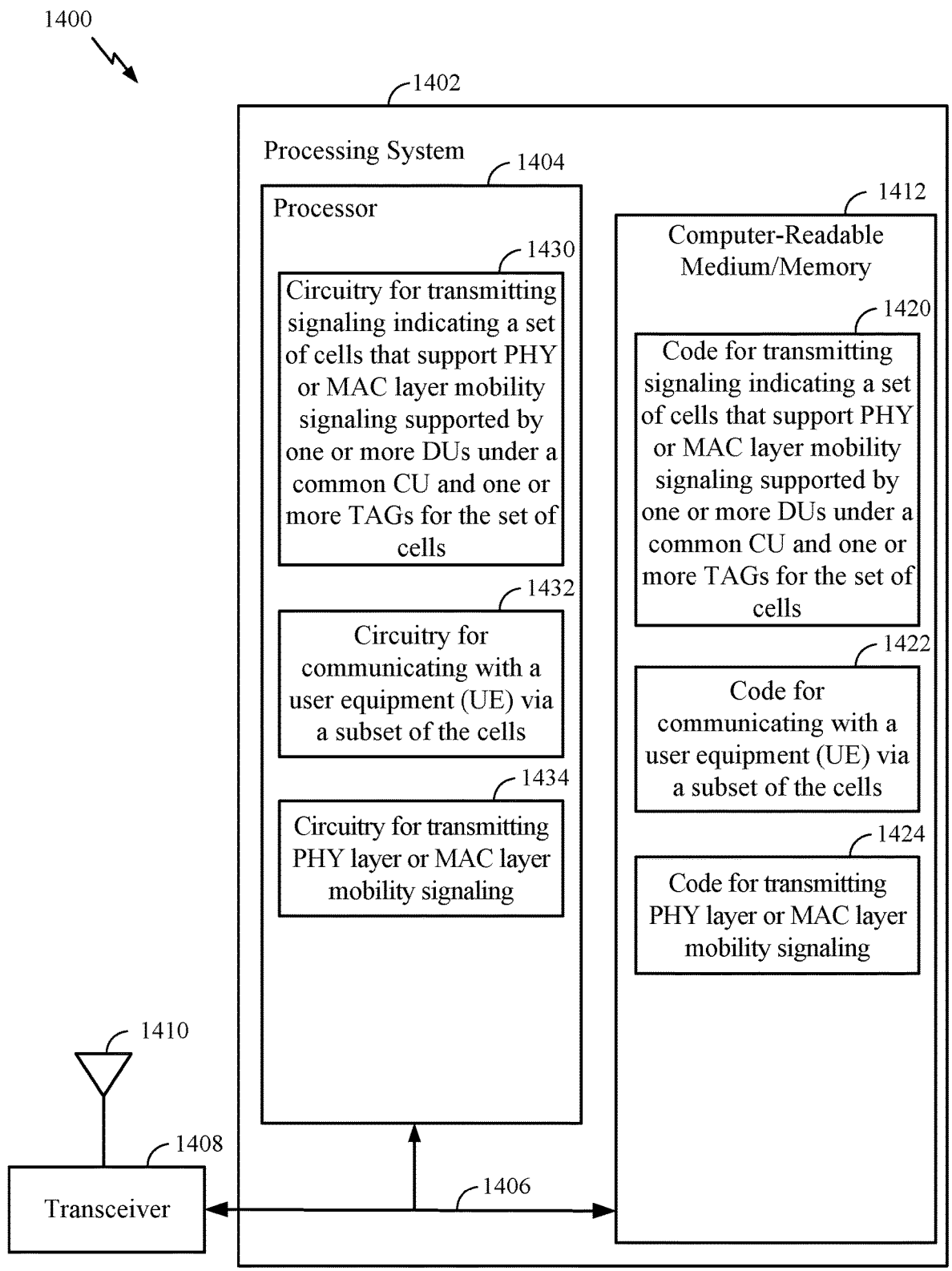
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 10. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 9, or other operations for performing the various techniques discussed herein for mobility within a set of cells using PHY layer or MAC layer signaling based on PHY layer or MAC layer measurement procedures. In certain aspects, computer-readable medium/memory 1412 stores code 1420 for transmitting signaling indicating a set of cells that support PHY or MAC layer mobility signaling supported by one or more DUs under a common CU and one or more TAGs for the set of cells; code 1422 for communicating with a user equipment (UE) via a subset of the cells; and code 1424 for transmitting PHY layer or MAC layer mobility signaling. In certain aspects, the processor 1404 has circuitry configured to implement the code stored in the computer-readable medium/memory 1412. The processor 1404 includes circuitry 1430 for transmitting signaling indicating a set of cells that support PHY or MAC layer mobility signaling supported by one or more DUs under a common CU and one or more TAGs for the set of cells; circuitry 1432 for communicating with a user equipment (UE) via a subset of the cells; and circuitry 1434 for transmitting PHY layer or MAC layer mobility signaling.

Example Clauses

Clause 1: A method for wireless communications by a user equipment (UE), comprising: receiving, from a network entity, signaling indicating a set of cells that support physical (PHY) layer or medium access control (MAC) layer mobility signaling supported by one or more distributed units (DUs) under a common central unit (CU) and one or more timing advance groups (TAGs) for the set of cells; identifying a subset of the set of cells activated to serve the UE; receiving PHY layer or MAC layer mobility signaling; updating the subset of activated cells based on the mobility signaling; and communicating with the subset of activated cells based on a timing advance associated with the one or more TAGs in which the updated subset of activated cells belong.

Clause 2: The method of Clause 1, wherein the signaling indicating the set of cells is received via radio resource control (RRC) signaling.

Clause 3: The method of any one of Clauses 1 or 2, further comprising: receiving, from the network entity, configuration information associating each cell in the set of cells with one of the one or more TAGs.

Clause 4: The method of Clause 3, wherein the mobility signaling identifies one or more cells to add to or remove from the subset of activated cells, and wherein communicating with the subset of activated cells comprises placing each of the one or more cells to add to the subset of activated cells in a corresponding TAG based on the configuration information.

Clause 5: The method of any one of Clauses 1 through 4, wherein the mobility signaling includes timing adjustment information for one or more cells to be added to the subset of activated cells.

Clause 6: The method of any one of Clauses 1 through 5, wherein the mobility signaling indicates that the UE is to perform a random access procedure with one or more cells to be added to the subset of activated cells.

Clause 7: The method of Clause 6, further comprising: performing the random access procedure with the one or more cells; and identifying a timing adjustment to apply to communications with each of the one or more cells based on the random access procedure.

Clause 8: The method of any one of Clauses 1 through 7, wherein communicating with the subset of activated cells comprises applying the timing advance on a per-TAG basis.

Clause 9: A method for wireless communications by a network entity, comprising: transmitting, to a user equipment (UE), an indication of a set of cells that support physical (PHY) layer or medium access control (MAC) layer mobility signaling supported by one or more distributed units (DUs) under a common central unit (CU) and one or more timing advance groups (TAGs) for the set of cells; communicating with the UE via a subset of the set of cells that are activated for serving the UE based on timing advance values associated with the one or more TAGs for the set of cells; and transmitting, to the UE, physical (PHY) layer or medium access control (MAC) layer mobility signaling to update the subset of the set of cells that are activated for serving the UE.

Clause 10: The method of Clause 9, wherein the indication of the set of cells is transmitted to the UE via radio resource control (RRC) signaling.

Clause 11: The method of any one of Clauses 9 or 10, further comprising: transmitting, to the UE, configuration information associating each cell in the set of cells with one of the one or more TAGs.

Clause 12: The method of any one of Clauses 9 through 11, wherein the mobility signaling identifies cells to add to or remove from the subset of activated cells.

Clause 13: The method of any one of Clauses 9 through 12, wherein the mobility signaling includes timing adjustment information for one or more cells to be added to the subset of activated cells.

Clause 14: The method of Clauses 9 through 13, wherein the mobility signaling indicates that the UE is to perform a random access procedure with one or more cells to be added to the subset of activated cells to identify a timing adjustment to apply to the one or more cells.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   receiving, from a network entity, signaling indicating (1) a set of cells that support physical (PHY) layer or medium access control (MAC) layer mobility signaling supported by one or more distributed units (DUs) under a common central unit (CU) and (2) one or more timing advance groups (TAGs) for the set of cells;
   identifying a subset of the set of cells activated to serve the UE;
   receiving PHY layer or MAC layer mobility signaling;
   updating the subset of activated cells based on the received mobility signaling; and
   communicating with the subset of activated cells based on a timing advance associated with the one or more TAGs in which the updated subset of activated cells belong.

2. The method of claim 1, wherein the signaling indicating the set of cells is received via radio resource control (RRC) signaling.

3. The method of claim 1, further comprising:
   receiving, from the network entity, configuration information associating each cell in the set of cells with one of the one or more TAGs.

4. The method of claim 3, wherein the received mobility signaling identifies one or more cells to add to or remove from the subset of activated cells, and wherein communicating with the subset of activated cells comprises placing each of the one or more cells to add to the subset of activated cells in a corresponding TAG based on the configuration information.

5. The method of claim 1, wherein the received mobility signaling includes timing adjustment information for one or more cells to be added to the subset of activated cells.

6. The method of claim 1, wherein the received mobility signaling indicates that the UE is to perform a random access procedure with one or more cells to be added to the subset of activated cells.

7. The method of claim 6, further comprising:
   performing the random access procedure with the one or more cells; and
   identifying a timing adjustment to apply to communications with each of the one or more cells based on the random access procedure.

8. The method of claim 1, wherein communicating with the subset of activated cells comprises applying the timing advance on a per-TAG basis.

9. A method for wireless communications by a network entity, comprising:
transmitting, to a user equipment (UE), an indication of a) a set of cells that support physical (PHY) layer or medium access control (MAC) layer mobility signaling supported by one or more distributed units (DUs) under a common central unit (CU) and c2) one or more timing advance groups (TAGs) for the set of cells;
communicating with the UE via a subset of the set of cells that are activated for serving the UE based on timing advance values associated with the one or more TAGs for the set of cells; and
transmitting, to the UE, physical (PHY) layer or medium access control (MAC) layer mobility signaling to update the subset of the set of cells that are activated for serving the UE.

10. The method of claim 9, wherein the indication of the set of cells is transmitted to the UE via radio resource control (RRC) signaling.

11. The method of claim 9, further comprising:
transmitting, to the UE, configuration information associating each cell in the set of cells with one of the one or more TAGs.

12. The method of claim 9, wherein the transmitted mobility signaling identifies cells to add to or remove from the subset of activated cells.

13. The method of claim 9, wherein the transmitted mobility signaling includes timing adjustment information for one or more cells to be added to the subset of activated cells.

14. The method of claim 9, wherein the transmitted mobility signaling indicates that the UE is to perform a random access procedure with one or more cells to be added to the subset of activated cells to identify a timing adjustment to apply to the one or more cells.

15. An apparatus for wireless communications by a user equipment (UE), comprising:
a memory having executable instructions stored thereon; and
at least one processor individually or collectively configured to execute the executable instructions to cause the apparatus to:
receive, from a network entity, signaling indicating (1) a set of cells that support physical (PHY) layer or medium access control (MAC) layer mobility signaling supported by one or more distributed units (DUs) under a common central unit (CU) and (2) one or more timing advance groups (TAGs) for the set of cells;
identify a subset of the set of cells activated to serve the UE;
receive PHY layer or MAC layer mobility signaling;
update the subset of activated cells based on the transmitted mobility signaling; and
communicate with the subset of activated cells based on a timing advance associated with the one or more TAGs in which the updated subset of activated cells belong.

16. The apparatus of claim 15, wherein the signaling indicating the set of cells is received via radio resource control (RRC) signaling.

17. The apparatus of claim 15, wherein the at least one processor is further configured to cause the apparatus to:
receive, from the network entity, configuration information associating each cell in the set of cells with one of the one or more TAGs.

18. The apparatus of claim 17, wherein the transmitted mobility signaling identifies one or more cells to add to or remove from the subset of activated cells, and wherein in order to communicate with the subset of activated cells, the at least one processor is configured to place each of the one or more cells to add to the subset of activated cells in a corresponding TAG based on the configuration information.

19. The apparatus of claim 15, wherein the transmitted mobility signaling includes timing adjustment information for one or more cells to be added to the subset of activated cells.

20. The apparatus of claim 15, wherein the transmitted mobility signaling indicates that the UE is to perform a random access procedure with one or more cells to be added to the subset of activated cells.

21. The apparatus of claim 20, wherein the at least one processor is further configured to cause the apparatus to:
perform the random access procedure with the one or more cells; and
identify a timing adjustment to apply to communications with each of the one or more cells based on the random access procedure.

22. The apparatus of claim 15, wherein in order to communicate with the subset of activated cells, the at least one processor is configured to apply the timing advance on a per-TAG basis.

23. An apparatus for wireless communications by a network entity, comprising:
a memory having executable instructions stored thereon; and
at least one processor individually or collectively configured to execute the executable instructions to cause the apparatus to:
transmit, to a user equipment (UE), an indication of (1) a set of cells supported by one or more distributed units (DUs) under a common central unit (CU) and (2) one or more timing advance groups (TAGs) for the set of cells;
communicate with the UE via a subset of the set of cells that are activated for serving the UE based on timing advance values associated with the one or more TAGs for the set of cells; and
transmit, to the UE, physical (PHY) layer or medium access control (MAC) layer mobility signaling to update the subset of the set of cells that are activated for serving the UE.

24. The apparatus of claim 23, wherein the indication of the set of cells is transmitted to the UE via radio resource control (RRC) signaling.

25. The apparatus of claim 23, wherein the at least one processor is further configured to cause the apparatus to:
transmit, to the UE, configuration information associating each cell in the set of cells with one of the one or more TAGs.

26. The apparatus of claim 23, wherein the transmitted mobility signaling identifies cells to add to or remove from the subset of activated cells.

27. The apparatus of claim 23, wherein the transmitted mobility signaling includes timing adjustment information for one or more cells to be added to the subset of activated cells.

28. The apparatus of claim 23, wherein the transmitted mobility signaling indicates that the UE is to perform a random access procedure with one or more cells to be added to the subset of activated cells to identify a timing adjustment to apply to the one or more cells.

\* \* \* \* \*